US012646868B2

(12) United States Patent
Stelzl et al.

(10) Patent No.: US 12,646,868 B2
(45) Date of Patent: Jun. 2, 2026

(54) CONNECTION SYSTEM COMPRISING A CABLE SHOE WITH AN ELASTOMER OVERMOLDED THEREON, A FIXATION ELEMENT FORMING A SECTION OF A LOCKING UNIT, AND A CAP ELEMENT AT LEAST SECTIONALLY COVERING THE FIXATION ELEMENT

(71) Applicant: Gebauer & Griller Kabelwerke Gesellschaft m.b.H., Vienna (AT)

(72) Inventors: Samuel Stelzl, Vienna (AT); Harald Wernert, Gaweinstal (AT); Manuel Heindl, Grosskrut (AT); Georg Langmann, Alberndorf im Pulkautal (AT)

(73) Assignee: Gebauer & Griller Kabelwerke Gesellschaft m.b.H., Vienna (AT)

( * ) Notice: Subject to any disclaimer, the term of this patent is extended or adjusted under 35 U.S.C. 154(b) by 346 days.

(21) Appl. No.: 18/539,414

(22) Filed: Dec. 14, 2023

(65) Prior Publication Data

US 2024/0204430 A1 Jun. 20, 2024

(30) Foreign Application Priority Data

Dec. 15, 2022 (EP) .................................... 22213966

(51) Int. Cl.
*H01R 11/26* (2006.01)

(52) U.S. Cl.
CPC .................................... *H01R 11/26* (2013.01)

(58) Field of Classification Search
None
See application file for complete search history.

(56) References Cited

U.S. PATENT DOCUMENTS 3,775,730 A 11/1973 Rowls et al.
5,833,499 A * 11/1998 Gonzales ............ H01M 50/572 439/522

(Continued)

FOREIGN PATENT DOCUMENTS

DE 10 2016 100 978 A1 10/2016
JP H11-167911 A 6/1999

OTHER PUBLICATIONS

European Search Report dated Jun. 5, 2023 in European Application No. 22213966.9, with English translation of the relevant parts.

*Primary Examiner* — Tho D Ta
(74) *Attorney, Agent, or Firm* — Collard & Roe, P.C.

(57) ABSTRACT

A connection system for electrically connecting a cable to a device connector includes a terminal lug having a connecting section having an opening for engaging the terminal lug into a connected state with the device connector. A fixation element fixes the terminal lug in place, in the connected state, on the device connector, with shape fit and/or with force fit, to produce a fixed state. The terminal lug has an elastomer overmolded onto it, at least in the region of its connecting section, that forms a holder having a wall. The fixation element forms a section of a locking unit arranged within the holder in the fixed state, at least in certain sections, that includes a cap element for covering the fixation element, at least in certain sections. The cap element presses against and elastically deforms the wall in the fixed state, at least in certain sections.

18 Claims, 9 Drawing Sheets

(56) References Cited

U.S. PATENT DOCUMENTS

| | | | | |
|---|---|---|---|---|
| 7,530,843 | B1 * | 5/2009 | Tesfay | H01R 13/521 439/587 |
| 10,211,565 | B2 * | 2/2019 | Trimborn | H01R 4/34 |
| 2021/0384651 | A1 * | 12/2021 | Attarzadeh | H01R 43/24 |
| 2021/0384668 | A1 * | 12/2021 | Attarzadeh | H01R 13/504 |
| 2022/0320764 | A1 * | 10/2022 | Chvala | H01R 11/12 |

* cited by examiner

Fig. 1
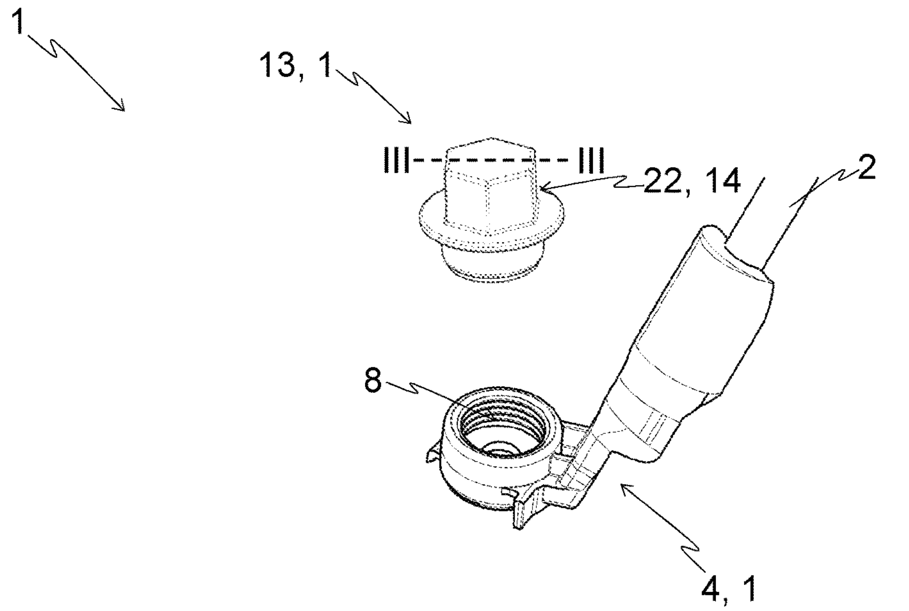
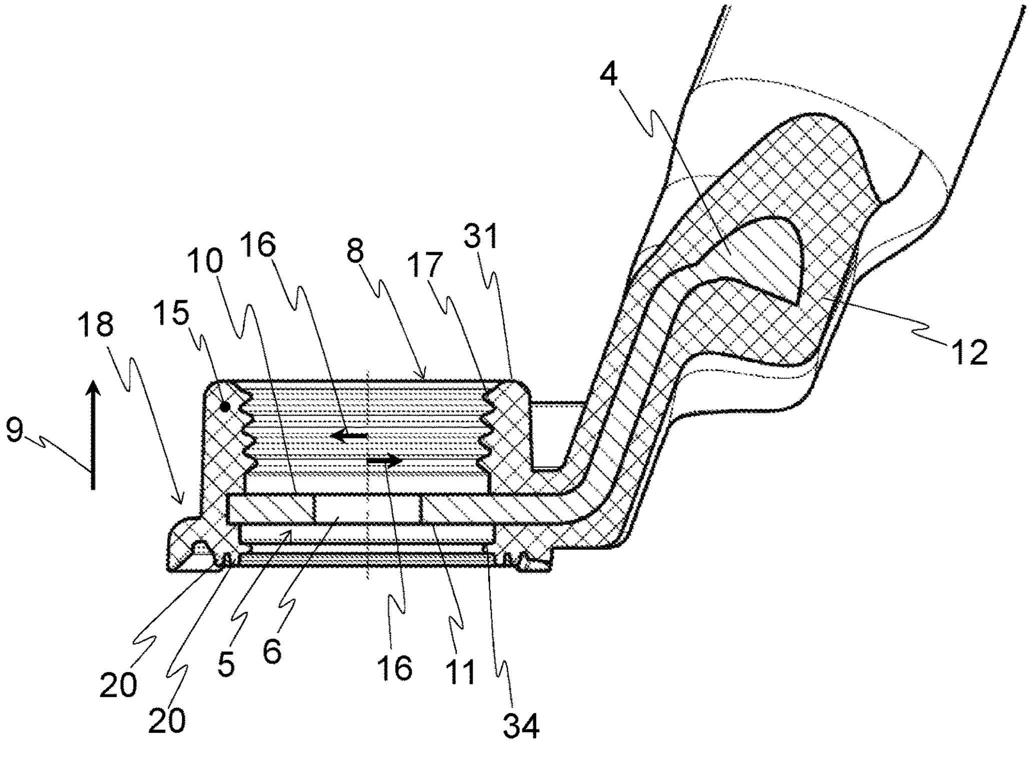
Fig. 2
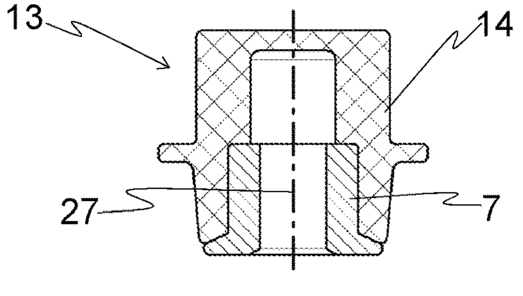
Fig. 3

Fig. 4
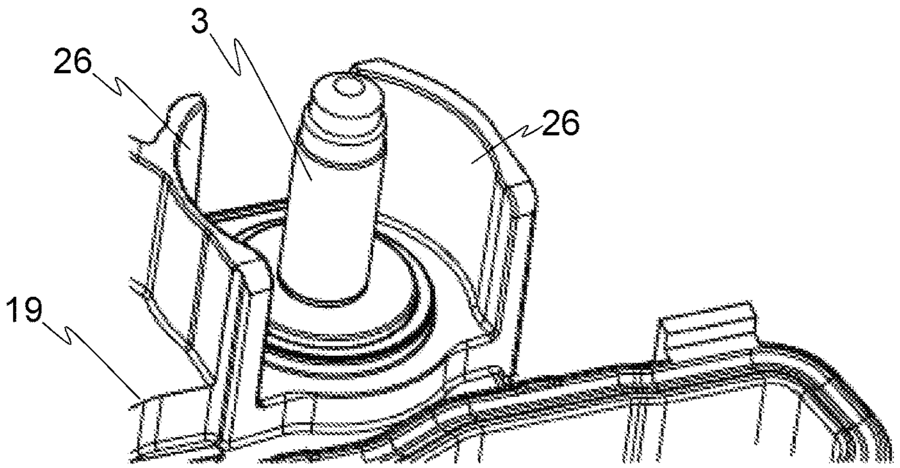
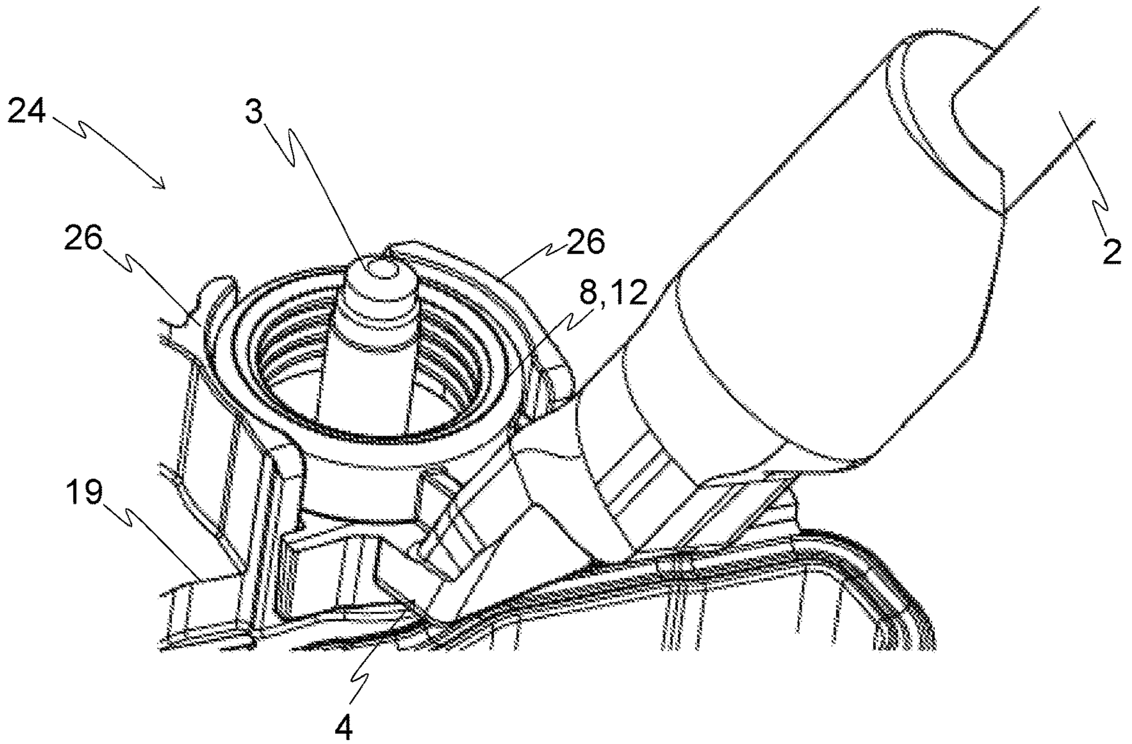
Fig. 5

Fig. 6
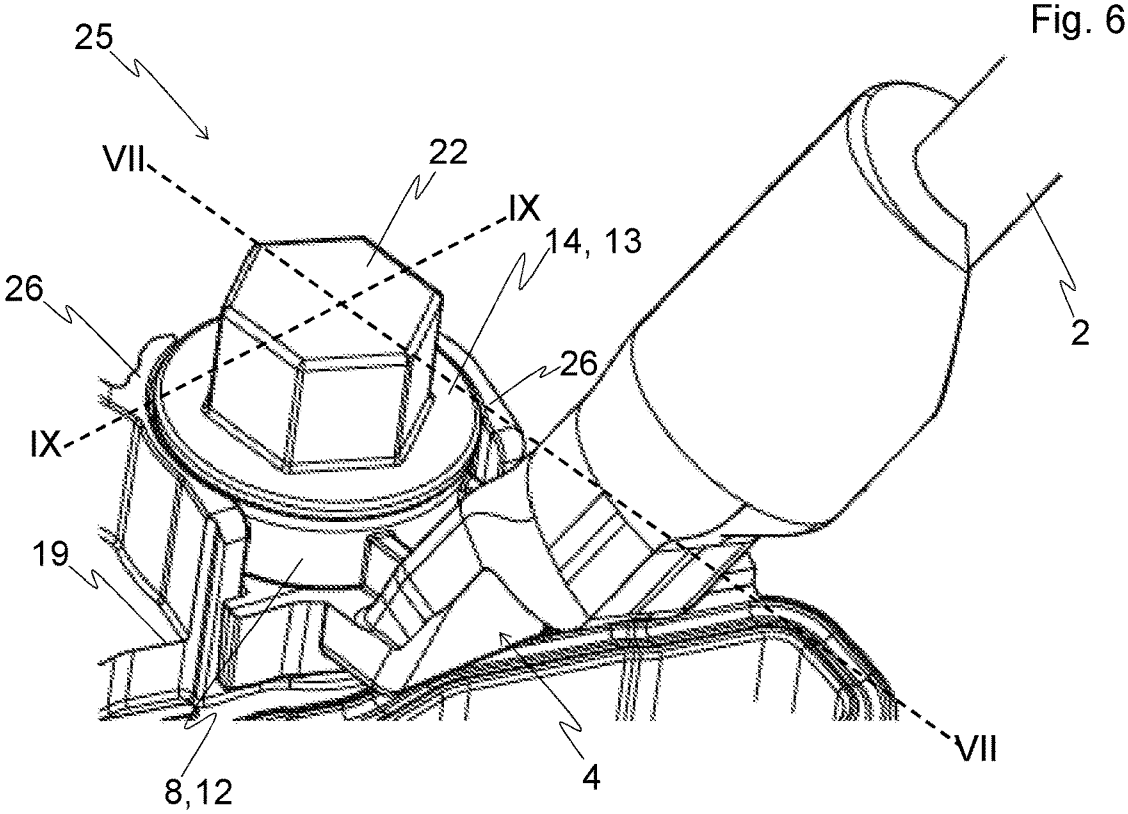
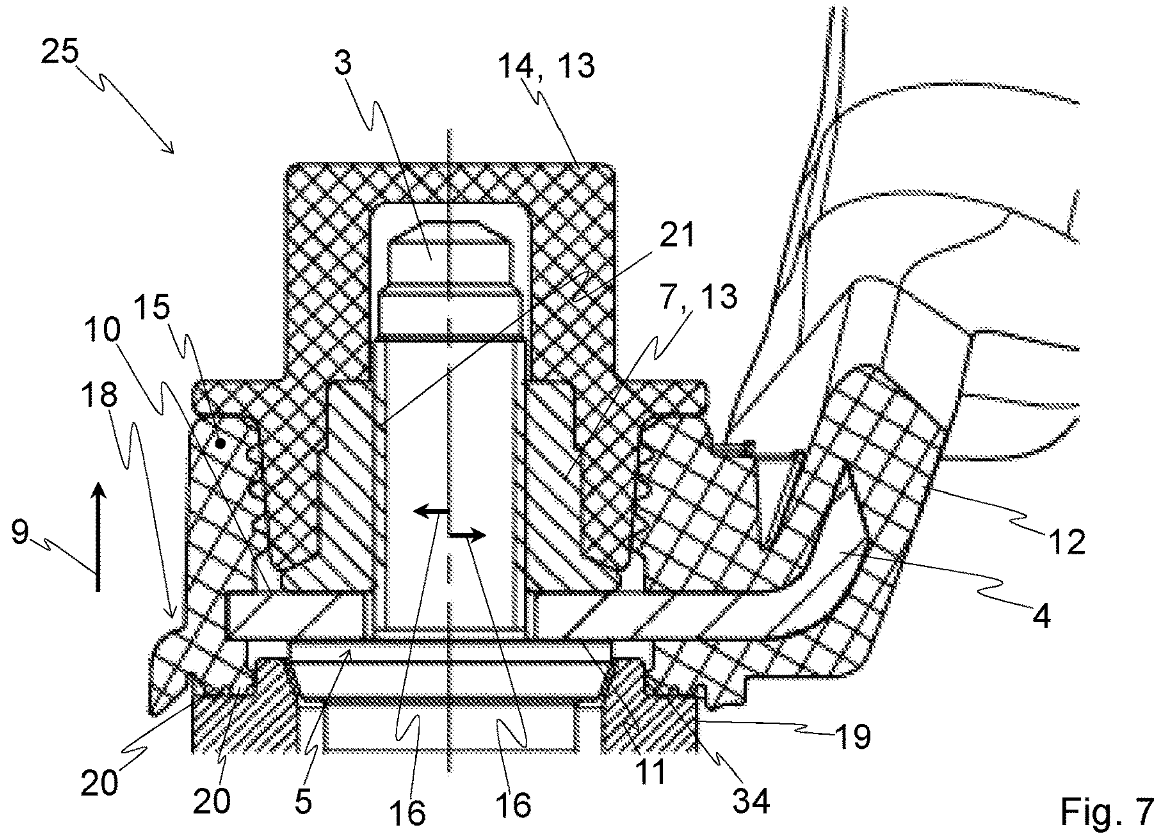
Fig. 7

Fig. 8
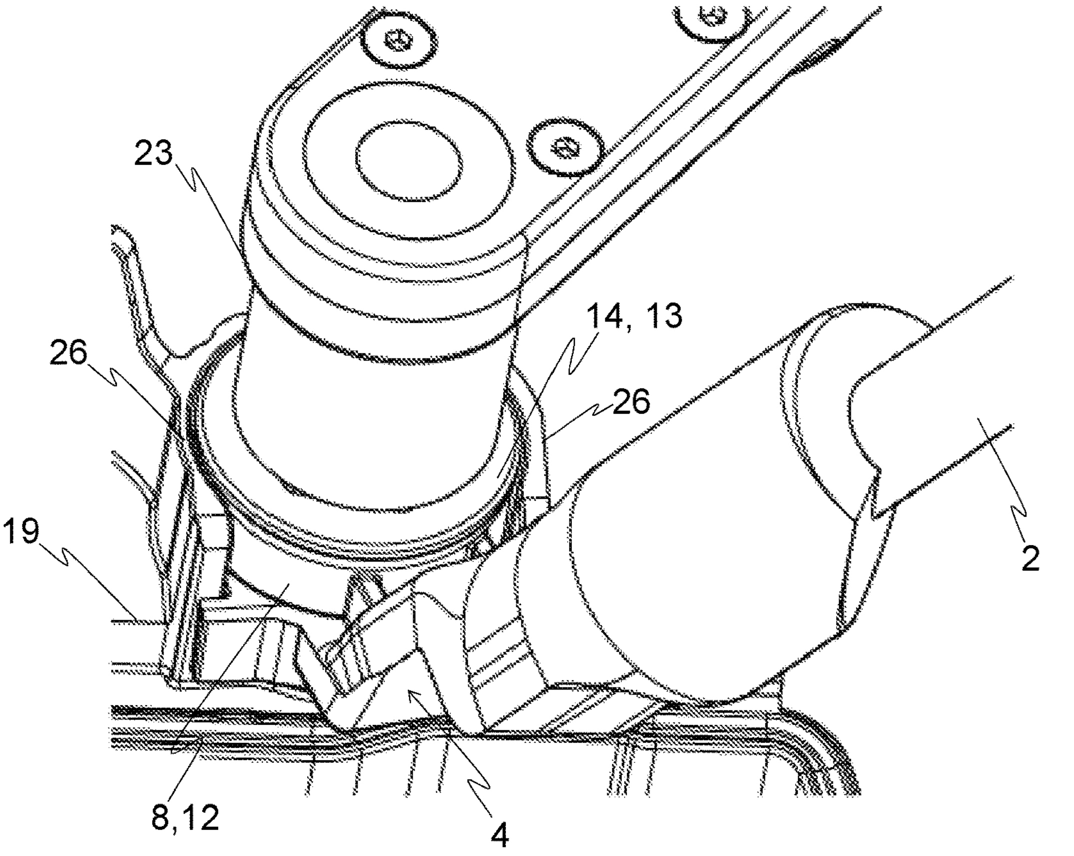
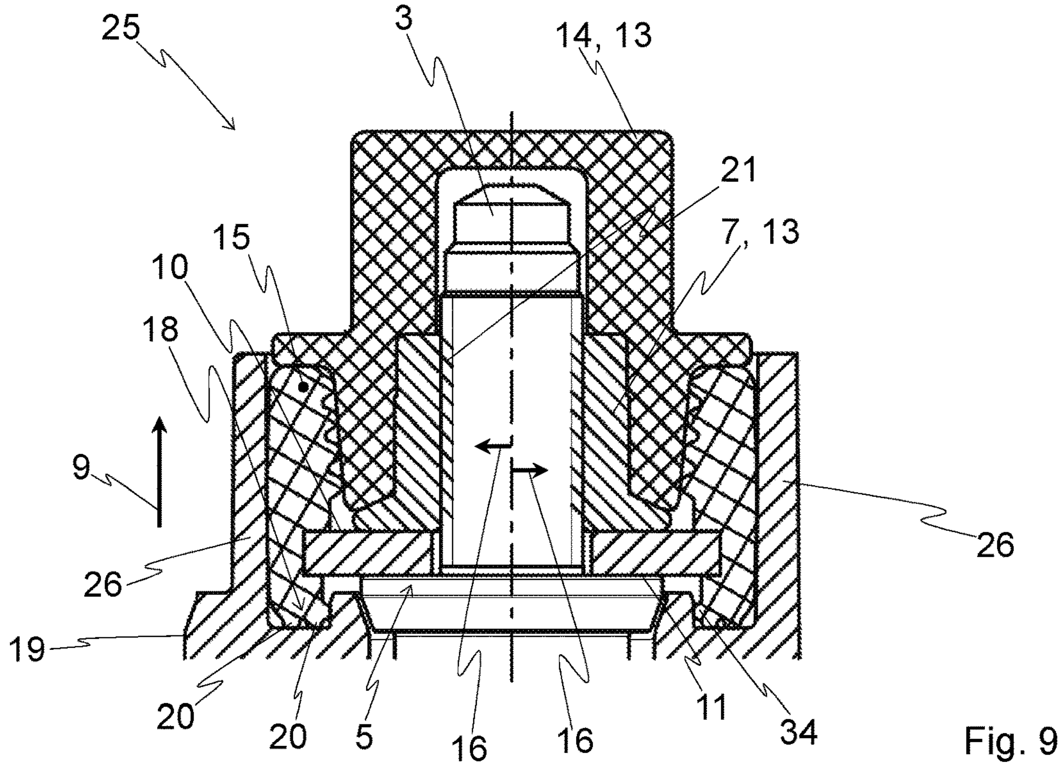
Fig. 9

Fig. 12
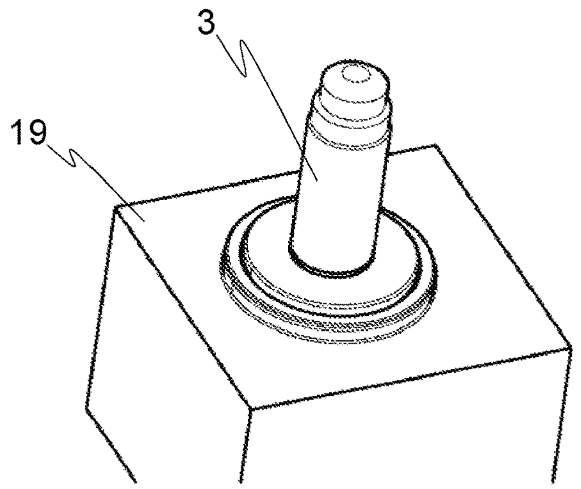
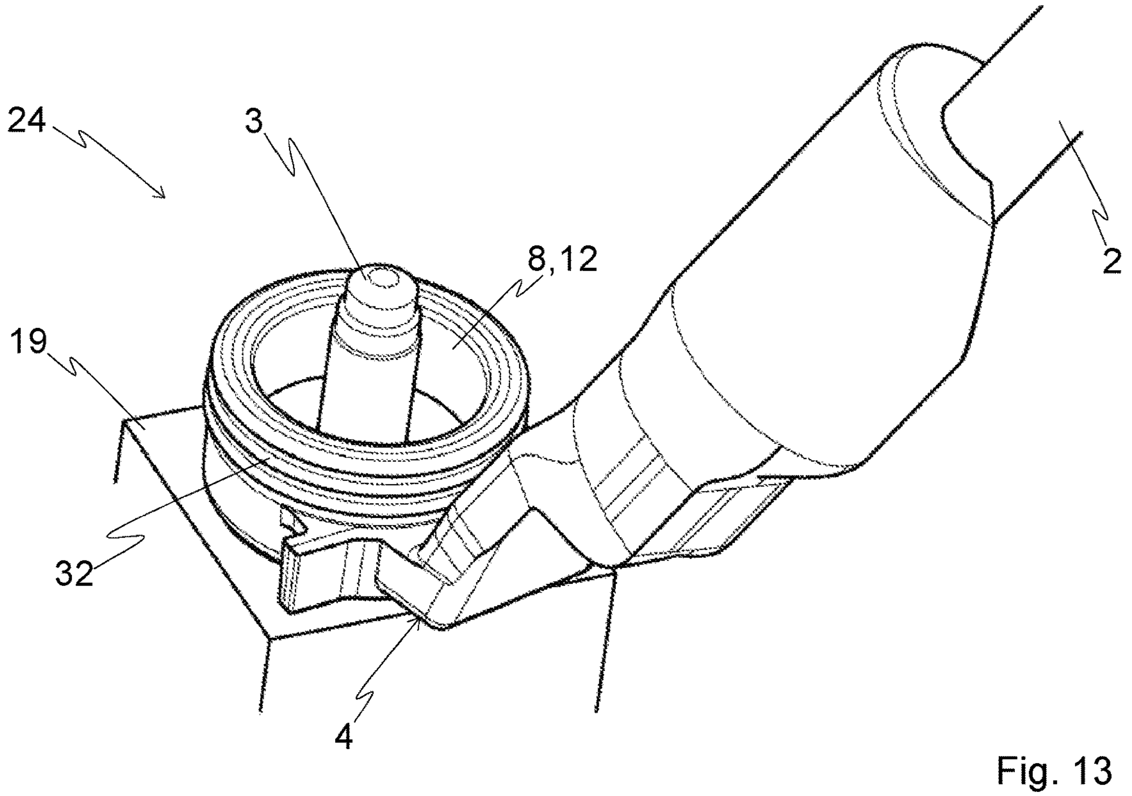
Fig. 13

Fig. 14
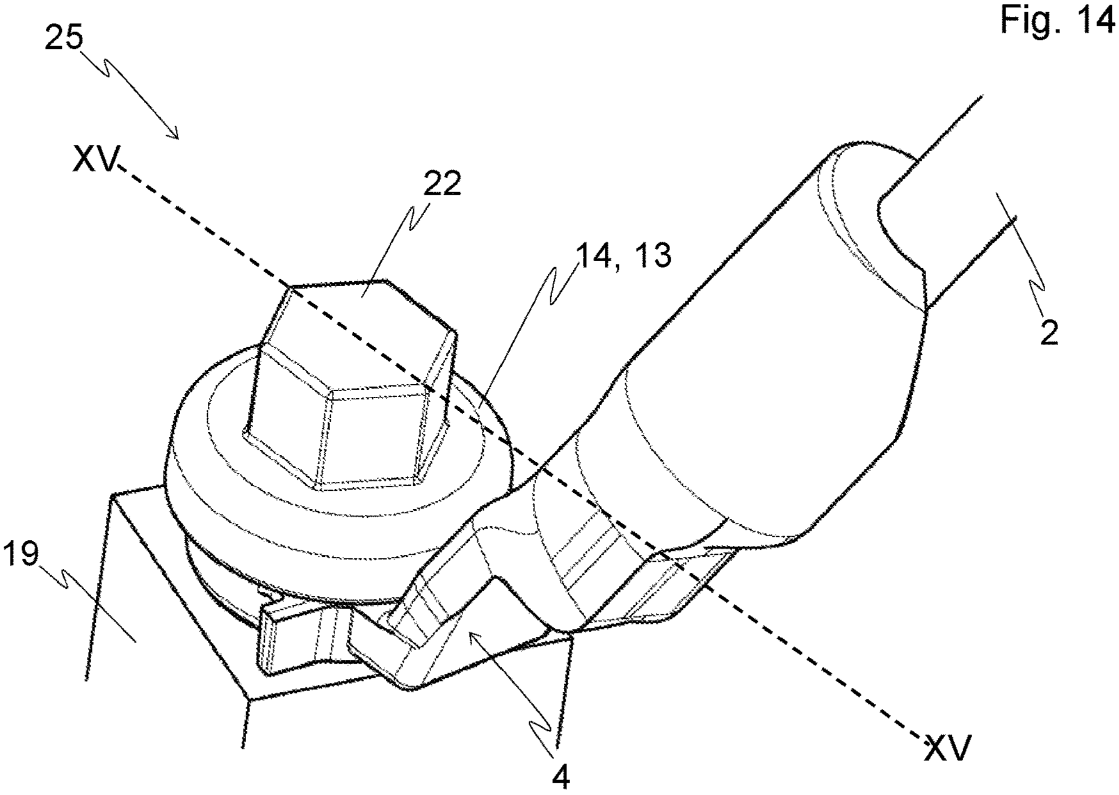
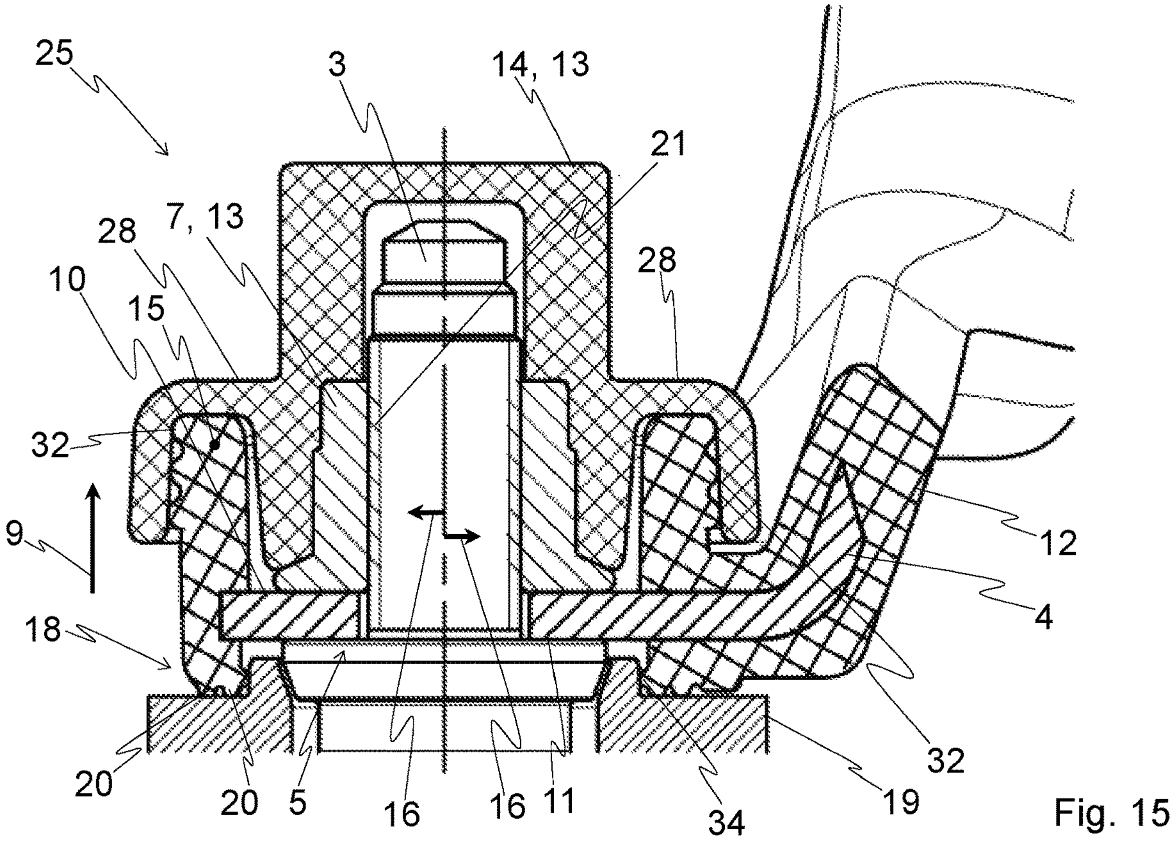
Fig. 15

Fig. 19
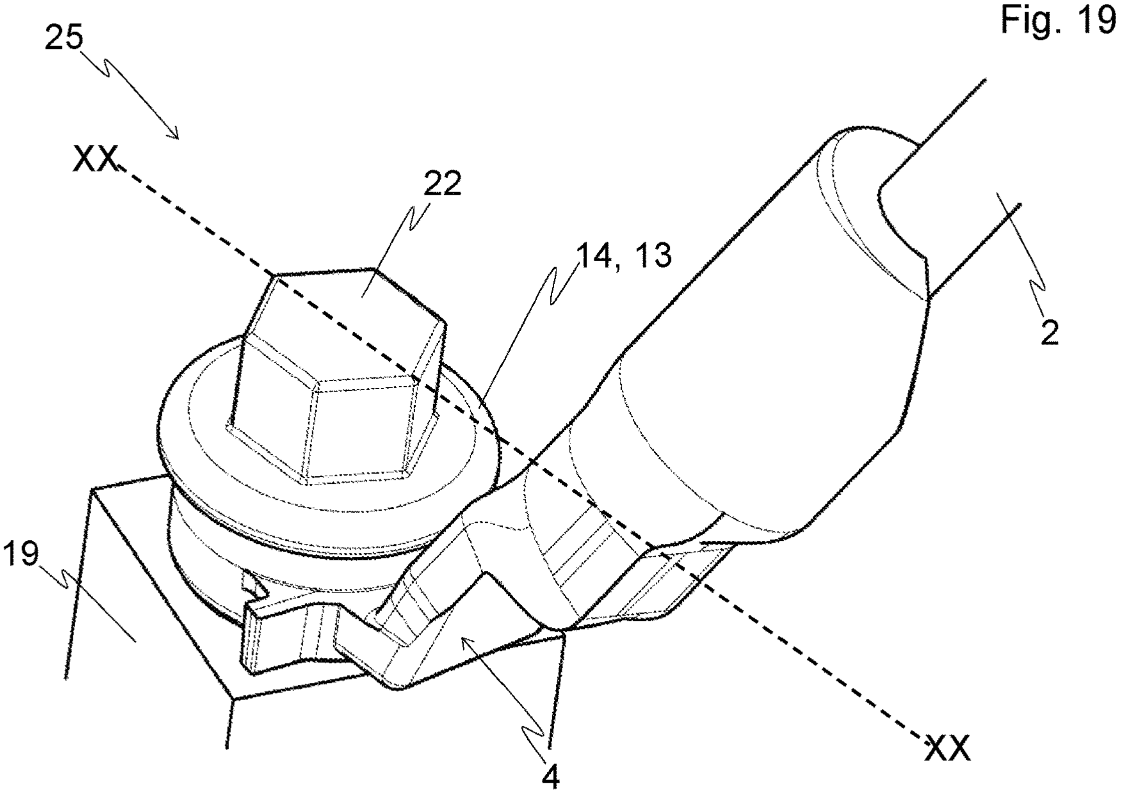
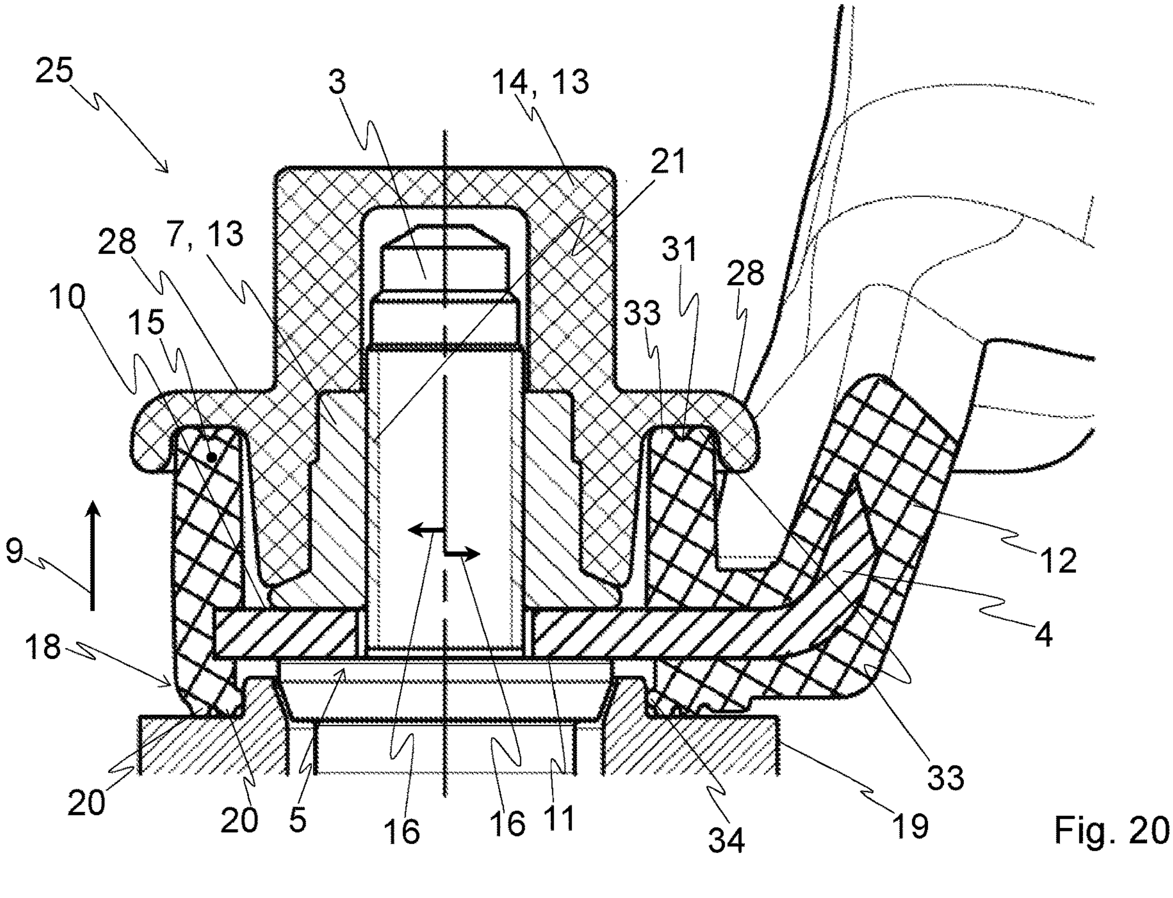
Fig. 20

CONNECTION SYSTEM COMPRISING A CABLE SHOE WITH AN ELASTOMER OVERMOLDED THEREON, A FIXATION ELEMENT FORMING A SECTION OF A LOCKING UNIT, AND A CAP ELEMENT AT LEAST SECTIONALLY COVERING THE FIXATION ELEMENT

CROSS REFERENCE TO RELATED APPLICATIONS

Applicant claims priority under 35 U.S.C. § 119 of European Application No. 22213966.9 filed Dec. 15, 2022, the disclosure of which is incorporated by reference.

BACKGROUND OF THE INVENTION

1. Field of the Invention

The present invention relates to a connection system for electrically connecting a cable to a device connector, the connection system comprising a terminal lug that has a connecting section having an opening that is open at the edge or closed at the edge, with which opening the terminal lug can be brought into engagement with the device connector so as to bring the terminal lug into a connected state with the device connector, the connection system furthermore comprising a fixation element with which the terminal lug can be fixed in place, in the connected state, on the device connector, with shape fit and/or with force fit, in particular by means of a screwed connection, in order to produce a fixed state.

2. Description of the Related Art

A plurality of connection systems for electrically connecting a cable to a device connector, for example to a plus pole on the starter of a motor, is known from the state of the art. In particular, such connection systems can comprise a terminal lug, in each instance, which is connected to the cable in an electrically conductive manner, and can be connected to or brought into engagement with the device connector, so as to subsequently be fixed in place on the device connector.

One problem that arises, aside from stable mechanical fixation and mechanical protection, is reliable sealing with regard to liquids, in particular water or sprayed water.

Known solutions comprise, for example, connection housings that are arranged in the region of a device connector, surrounding it, wherein the terminal lug must be introduced into the connection housing accordingly, so as to make the connection. Disadvantages of such solutions, with regard to flexibility and efficiency, are obvious.

Furthermore, cover caps composed of an elastomer are known, which are pressed onto the device connector in order to fix the terminal lug in place on the device connector, wherein the cover cap, in each instance, makes contact with a device housing from which the device connector projects or on which the device connector is arranged, and deforms elastically so as to achieve a sealing effect. In the case of these solutions, however, problems can occur during installation, because in general, no clear signal for correct placement of the cover cap can be generated. In particular, in contrast to screwed connections, there is no defined tightening torque that can be monitored.

Furthermore, the elastomer material brings with it problems during installation using tools, due to its relatively low shape stability, and this relatively low shape stability, in particular, makes automated installation difficult or even impossible.

SUMMARY OF THE INVENTION

It is therefore the task of the present invention to make available a connection system for electrically connecting a cable to a device connector, which system avoids the disadvantages mentioned above. In particular, the connection system should be sealed and nevertheless have a simple structure, and it should be possible to install it rapidly, and furthermore it should allow problem-free installation using a tool.

To accomplish the task stated above, it is provided, according to the invention, in the case of a connection system for electrically connecting a cable to a device connector, the connection system comprising a terminal lug that has a connecting section having an opening that is open at the edge or closed at the edge, with which opening the terminal lug can be brought into engagement with the device connector so as to bring the terminal lug into a connected state with the device connector, the connection system furthermore comprising a fixation element with which the terminal lug can be fixed in place, in the connected state, on the device connector, with shape fit and/or with force fit, in particular by means of a screwed connection, in order to produce a fixed state, that the terminal lug has an elastomer overmolded onto it, at least in the region of its connecting section, wherein the elastomer overmold forms a holder having a wall that is arranged on the connecting section and extends in a normal direction, closed on the circumference, wherein the normal direction stands normal to a plane of the opening and faces away from a top side of the connecting section, and that the fixation element forms a section of a locking unit, which is arranged within the holder in the fixed state, at least in certain sections, and which comprises a cap element for covering the fixation element, at least in certain sections, wherein the cap element is set up for pressing against the wall in the fixed state and elastically deforming this wall, at least in certain sections, so as to achieve a seal between the wall and the cap element.

The terminal lug can be connected to the cable in a known manner, for example by means of crimping.

The device connector can typically be a connector bolt or a connector pin, which can have a thread, if applicable. The terminal lug can then be brought into engagement with the device connector, in that the terminal lug is pushed over the device connector with its opening.

The edge of the opening fundamentally does not have to be closed in order to nevertheless achieve a sealed arrangement, in the fixed state, with regard to liquids, in particular sprayed water. In particular, openings having open edges are possible, in which the edge has a C shape, which approximates an O shape, in other words where the edge of the opening is only slightly open and approximates a closed shape.

With regard to the fixation of the terminal lug on the device connector by means of the fixation element, it should be stated that a plurality of known fixation possibilities can be used. For example, it is conceivable that the fixation element and the device connector are designed in such a way that the fixation element is connected to the device connector by means of a type of bayonet closure or by means of latching or clamping or a screwed connection or by means of a combination of several of the aforementioned means. As a result, defined parameters for installation using a corresponding tool are possible, for example a defined tightening torque that can be applied in a targeted manner, using a torque wrench, and thereby allows automation or monitored installation.

With regard to the use of a suitable tool, it should be noted that the locking unit with the cap element makes a robust engagement possibility available for the tool, in each instance, wherein the cap element can be designed accordingly for a desired tool.

The elastomer overmold encompasses the terminal lug or the connecting section circumferentially, at least in certain sections. It is true that the wall extends in the normal direction, but in this regard the progression of the wall does not have to be completely parallel to the normal direction, i.e. the wall does not have to run perpendicular to the plane of the opening, but rather can also run at a slant to the plane of the opening, for example.

It should be noted that the elastomer overmold can furthermore also extend counter to the normal direction.

In that the cap element presses against the wall that is formed by the elastomer overmold, in any case, and deforms this wall elastically, at least in certain sections, a seal is achieved between the wall and the cap element, and therefore a seal of the device connector is achieved, in total, from the side of the terminal lug on which the holder is arranged. In this regard, the said seal does not relate just to liquids, in particular sprayed water, of course, but also against other contaminants.

In this regard, the locking unit does not have to have any elastomer material, and this feature simplifies the structure and/or the production of the connection system.

In this way, both fixation of the terminal lug on the device connector and the seal mentioned above can be achieved in a single work step. Accordingly, very rapid, efficient and economical installation is made possible with the connection system according to the invention, which installation can furthermore be monitored and reproduced accordingly, and ultimately automated.

In a preferred embodiment of the connection system according to the invention, it is provided that the cap element is set up for being arranged in the holder, at least in certain sections, in the fixed state, and, in this regard, for elastically deforming the wall by means of pressure from the interior of the holder outward, with a directional component parallel to radial directions that stand normal to the normal direction and face outward. In this way, a particularly reliable seal can be achieved, wherein the cap element is arranged in the holder, at least in certain sections, similar to a plug, pressing against the wall from the inside to the outside.

The pressure exerted on the wall because of the elastic deformation of the latter corresponds to a force that engages on the wall at least with a directional component, preferably completely, parallel to the radial directions.

The radial directions accordingly face away outward from a longitudinal axis of the cap element or the locking unit and stand normal to the longitudinal axis.

Alternatively or in addition, it is provided, in the case of a preferred embodiment of the connection system according to the invention, in order to further improve the seal, that the cap element has a cross-section with projecting arms, in a section plane, wherein a longitudinal axis of the locking unit lies in the section plane and wherein in the fixed state, the arms run, at least in certain sections, with a directional component parallel to radial directions that stand normal to the normal direction and face outward, and, at least in certain sections, with a directional component anti-parallel to the normal direction, wherein the cap element is set up for encompassing the wall with the arms, in the fixed state, at least in certain sections, and for elastically deforming the wall by means of pressure from the outside, with a directional component counter to the radial directions.

It should be emphasized that the arms occur only in the aforementioned cross-section. In particular, the arms can result from a cut through a circumferential section of the cap element, which circumferential section can have a brim-like form, for example, in an axonometric view of the locking unit or of the cap element.

The said directional components do not have to be one hundred percent. In other words, the arms do not have to stand normal to the longitudinal axis of the locking unit or of the cap element in certain sections, and also do not have to run precisely anti-parallel to a longitudinal direction in certain sections, wherein the longitudinal direction is parallel to the longitudinal axis and faces from the fixation element to the cap element.

In the simplest case, the arms can simply run projecting away at a slant, so that a gap occurs, which widens toward the connecting section in the fixed state, and into which the wall is introduced with an end face. Accordingly, the arms encompass the wall from the end face and from the outside, in a section that follows the end face, so that a pressure can be applied to the wall from the outside, by way of the arms.

The pressure exerted on the wall on the basis of its elastic deformation corresponds to a force that engages on the wall with at least a directional component, preferably completely, anti-parallel to the radial directions.

Aside from the aforementioned further improvement of the seal, a certain mechanical protection of the wall is furthermore achieved by means of the engagement around the wall, in certain sections, by the locking unit or the cap element.

According to what has been said above, the progression of the arms can also be structured in consecutive sections, particularly different ones. Accordingly, it is provided, in a particularly preferred embodiment of the connection system according to the invention, that the arms run parallel to one of the radial directions with a directional component in a first arm section, in each instance, and in a second arm section they run with a directional component anti-parallel to the normal direction, wherein the second arm section is arranged behind the first arm section, viewed in the corresponding radial direction. In this regard, the said directional components do not have to be one hundred percent, as has already been explained, although the latter is, of course, also possible.

The advantage of this embodiment lies, in particular, in that the resulting gap in which the wall is arranged with its end face does not necessarily have to run to an acute point, and thereby somewhat more room can be made available for the wall, and thereby, in turn, the type of elastic deformation of the wall can be adjusted in a more targeted manner, so as to achieve the desired result in terms of tightness.

Alternatively or additionally, it can be provided that the cap element also presses against the end face of the wall, so as to further improve the seal. Accordingly, it is provided, in a preferred embodiment of the connection system according to the invention, that the cap element has a cross-section with arms projecting away in a section plane, wherein a longitudinal axis of the locking unit lies in the section plane, and whereby in the fixed state the arms run, at least in certain sections, with a directional component parallel to the radial directions that stand normal to the normal direction and face outward, wherein the cap element is set up for pressing against an end face of the wall that faces away for the connecting section, at least in certain sections, and thereby for elastically deforming the wall.

In this regard, the said directional component does not have to be one hundred percent, as already explained above, although the latter is, of course, also possible.

Once again, a brim-like form of the section of the cap element that forms the arms in the said cross-section can occur in an axonometric view.

In this regard, the arms can project beyond the wall in the corresponding radial direction, but do not necessarily have to do so. In the latter case, the cap element presses only against a section of the end face of the wall in the fixed state; in the first case, the cap element can sometimes also press against the entire end face of the wall in the fixed state—depending on the concrete geometry of the arms, on the one hand, and of the end face of the wall, on the other hand.

The pressure exerted on the wall on the basis of its elastic deformation corresponds to a force that engages, at least with a directional component, preferably completely, on the wall or on its end face, anti-parallel to the normal direction.

Aside from the said further improvement of the seal, a certain mechanical protection of at least a section of the end face of the wall is achieved by means of the arms.

It should be emphasized that it is not excluded that furthermore, a certain encompassing of the wall by the arms exists, as described further above.

In a preferred embodiment of the connection system according to the invention, it is provided that the elastomer overmold is also arranged, at least in certain sections, on the top side of the connecting section and/or on an underside of the connecting section that lies opposite the top side. This arrangement increases the mechanical stability of the elastomer overmold, and thereby in turn an improved sealing effect can be achieved, because the forces that bring about the elastic deformation of the wall are increased.

In a preferred embodiment of the connection system according to the invention, it is provided that the holder narrows toward the normal direction, wherein preferably the wall is configured to narrow conically toward the normal direction, at least in certain sections. The narrowing can also take place in one or more steps, for example.

The corresponding widening of the holder in the normal direction facilitates placement of the locking unit in the holder, at least in certain sections.

In a preferred embodiment of the connection system according to the invention, it is provided that the holder has ribs that lie on the inside, which project away from the wall in the interior of the holder, with a directional component counter to radial directions that stand normal to the normal direction and face outward, and/or that the holder has ribs that lie on the outside, which project away from the wall on the outside, with a directional component parallel to the radial directions, and/or that the holder has ribs on the end face, which project away from an end face of the wall that faces away from the connecting section, with a directional component parallel to the normal direction.

The sealing effect can be further improved by means of the ribs.

The ribs that lie on the inside improve the sealing effect when the cap element is arranged in the holder, at least in certain sections, in the fixed state, and deforms the wall elastically outward by means of pressure from the interior of the holder, if, in this regard, at least one of the ribs that lie on the inside is elastically deformed.

Preferably, at least one of the ribs that lie on the inside runs in a circumferentially closed manner, so as to maximize the sealing effect.

The ribs that lie on the outside improve the sealing effect if the cap element encompasses the wall in the fixed state, at least in certain sections, and deforms the wall elastically by means of pressure from the outside, if, in this regard, at least one of the ribs that lie on the outside is elastically deformed.

Preferably, at least one of the ribs that lie on the outside runs in a circumferentially closed manner, so as to maximize the sealing effect.

The end-face ribs improve the sealing effect if, in the fixed state, the cap element presses against an end face of the wall that faces away from the connecting section, at least in certain sections, and thereby deforms the wall elastically, if, in this regard, at least one of the end-face ribs is elastically deformed.

Preferably, at least one of the end-face ribs runs in a circumferentially closed manner, so as to maximize the sealing effect.

In a preferred embodiment of the connection system according to the invention, it is provided that the elastomer overmold forms a sealing foot that is arranged on the connecting section opposite to the holder and extends in a circumferentially closed manner counter to the normal direction, so as to lie against a device housing in the fixed state, forming a seal.

As has already been mentioned, the device connector is arranged on the device housing or projects away from it.

In this regard, the sealing foot does not have to run precisely anti-parallel to the normal direction, but rather can also run at a slant to it, if applicable.

Thus, a seal of the device connector can be achieved not just from the side of the terminal lug on which the holder is arranged, but rather also from the opposite side, which faces the device housing in the fixed state, so that the device connector can be sealed off from all sides.

For further improvement of the seal by means of the sealing foot, it is provided, in a particularly preferred embodiment of the connection system according to the invention, that the sealing foot has at least one axial sealing lip that runs in a circumferentially closed manner and extends with a directional component counter to the normal direction, and/or at least one radial sealing lip that runs in a circumferentially closed manner and extends with a directional component counter to the radial directions that stand normal to the normal direction and face outward.

Preferably, at least two, particularly preferably precisely two axial sealing lips are provided, so as to guarantee a certain fail-safe performance with regard to the at least one axial sealing lip.

The at least one axial sealing lip improves the sealing effect if, in the fixed state, the sealing foot is pressed against the device housing with a directional component anti-parallel to the normal direction, and if the at least one axial sealing lip deforms elastically as a result. The at least one radial sealing lip improves the sealing effect if, in the fixed state, the sealing foot is pressed against the device housing with a directional component anti-parallel to the radial directions, and if the at least one radial sealing lip deforms elastically as a result. In this regard, the directional component, in each instance, depends on the concrete form of the device housing or on the interplay of the geometries of the sealing foot and of the device housing in the region of the device connector.

Fundamentally, different production possibilities for the locking unit or for the fixation element and the cap element are conceivable, for example one-piece production of the fixation element with the cap element. A further production possibility consists in overmolding the fixation element so that the cap element is formed by the corresponding overmold. In a preferred embodiment of the connection system according to the invention, it is provided that the fixation element is connected to the cap element by means of joining, in particular by means of pressing using ultrasound. In this regard, pressing can take place hot or cold. On the one hand, stable and cost-advantageous production is achieved in this way. On the other hand, this method of production opens up a greater possibility of configuring the cap element, on the one hand, and the fixation element, on the other hand, in particular in comparison with one-piece production.

For example, in this way the cap element can be designed for engagement with specific tools, without problems.

Furthermore, different strengths, for example, can be provided for the fixation element and the cap element, so as to take the different functions of these elements into particular account.

In order to meet the mechanical stability requirements for the cap element, it is provided, in a preferred embodiment of the connection system according to the invention, that the cap element is produced from a thermoplastic or from a thermoplastic having at least one filler, in particular from a polyamide reinforced with glass fibers. Aside from polyamide, polypropylene would be a further example of a possible thermoplastic plastic for the production of the cap element.

It is also conceivable, of course, to produce the cap element from other robust plastics, however, for example from a duroplastic or from an elastomer having great hardness, if applicable.

As has already been described, the cap element can be designed with regard to problem-free engagement of specific tools. Accordingly, it is provided, in a preferred embodiment of the connection system according to the invention, that the cap element has an activation section formed as a screw head, in particular as a hex head. Of course, activation sections having a different shape are also possible, for example in the form of an Allen screw head or having a hexalobular internal or hexalobular external screw driving profile. An example of a tool that can suitably engage on such activation sections would be a torque wrench.

Analogous to what has been said above, a system is provided, according to the invention, comprising a connection system according to the invention as well as a device housing on which a device connector is arranged, preferably projecting away.

In a preferred embodiment of the system according to the invention, it is provided that the device housing has at least one projecting wall section that is at a distance from the device connector, wherein in the fixed state, the wall is pressed against the at least one wall section by means of the cap element, at least in certain sections.

The at least one wall section acts as a counter-bearing. In this way, the pressure exerted on the wall by the cap element can be further increased, and the seal—at least in the region of the at least one wall section—can be further improved. Furthermore, the mechanical stability as a whole is increased.

In order to guarantee an increase in the sealing effect and an improvement of the mechanical stability over the greatest region possible, on the one hand, and to guarantee sufficient room for the terminal lug, on the other hand, it can be provided that at least two, preferably precisely two wall sections that lie opposite one another are provided. Depending on the dimensioning and the geometry of the terminal lug, the latter can be arranged between the wall sections in the connected or fixed state, in certain sections, if applicable.

Alternatively or additionally, it can be provided that the at least one wall section covers an angle range, in total, of at least 120°, preferably at least 180°, around the device connector. In this way, it can be ensured that the seal is improved over a significant region around the device connector.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows an axonometric view of a connection system according to the invention in a first embodiment;

FIG. 2 shows a sectional view of a terminal lug from FIG. 1;

FIG. 3 shows a sectional view of a locking unit from FIG. 1, which is indicated by the section line III-III in FIG. 1;

FIG. 4 shows an axonometric view of a device connector on a device housing;

FIG. 5 shows an axonometric view of the terminal lug from FIG. 1 in a connected state with the device connector from FIG. 4;

FIG. 6 shows a view analogous to FIG. 5, wherein the terminal lug has been brought into a fixed state with the device connector, by means of a fixation element of the locking unit;

FIG. 7 shows a sectional view that is indicated by the section line VII-VII in FIG. 6;

FIG. 8 shows a view analogous to FIG. 6, wherein a tool for tightening the locking unit or the fixation element is shown;

FIG. 9 shows a sectional view, which is indicated by the section line IX-IX in FIG. 6;

FIG. 12 shows an axonometric view of a device connector on a further device housing;

FIG. 13 shows an axonometric view of the terminal lug from FIG. 10 in a connected state with the device connector from FIG. 12;

FIG. 14 shows a view analogous to FIG. 13, wherein the terminal lug has been brought into the fixed state with the device connector by means of the fixation element of the locking unit;

FIG. 15 shows a sectional view that is indicated by the section line XV-XV in FIG. 14;

FIG. 19 shows a view analogous to FIG. 18, wherein the terminal lug has been brought into the fixed state with the device connector, by means of the fixation element of the locking unit; and FIG. 20 shows a sectional view that is indicated by the section line XX-XX in FIG. 19.

DETAILED DESCRIPTION OF PREFERRED EMBODIMENTS

Figure 10:
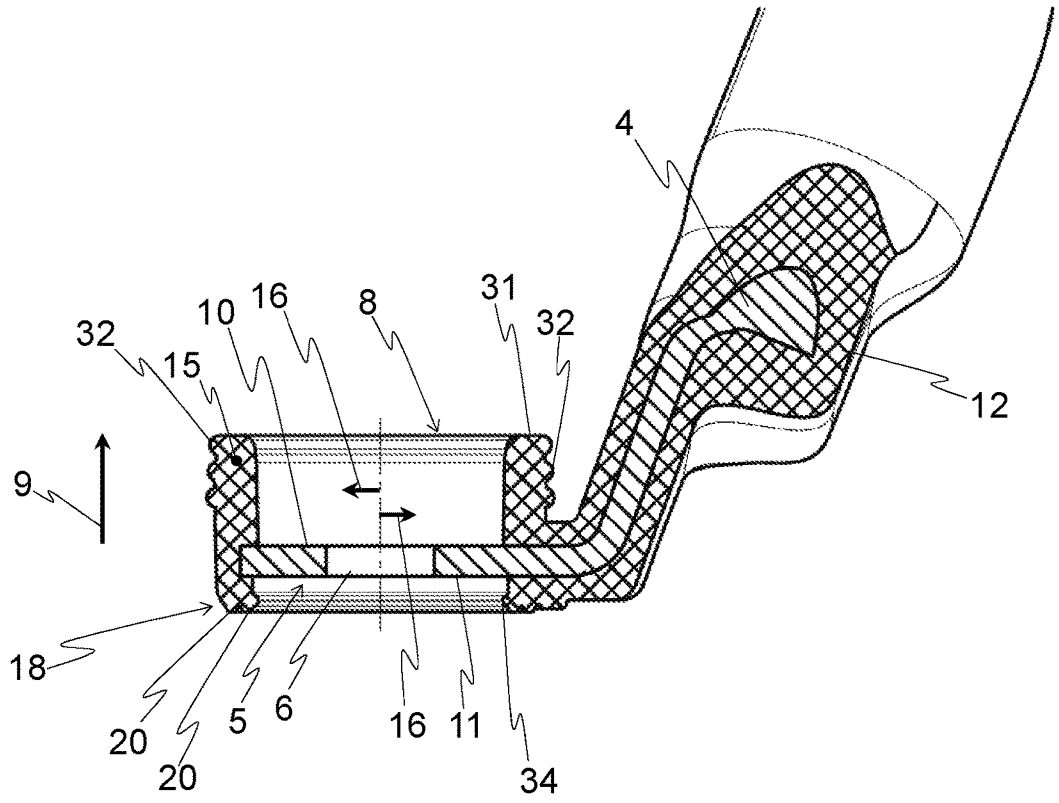
FIG. 10 shows a sectional view of the terminal lug of a second embodiment of the connection system according to the invention, analogous to FIG. 2.

In the axonometric view of FIG. 1, a first embodiment of a connection system 1 according to the invention is shown, for electrically connecting a cable 2 to a device connector 3. FIG. 4 shows a device connector 3 that is configured as a pin that projects away from a device housing 19.

The connection system 1 comprises a terminal lug 4, with which the cable 2 is connected in a known manner, for example by means of crimping.

As can be seen well in the sectional view of FIG. 2, the terminal lug 4 has a connecting section 5 having an opening 6 that is closed on the edge, with which opening the terminal lug 4 can be brought into engagement with the device connector 3, in particular in that the terminal lug 4 is pushed over the pin-like device connector 3 with the opening 6.

In this way, a connected state 24 is produced, which is illustrated in FIG. 5, wherein the connection system 1 and the device housing 19, together with the device connector 3, form parts of a system according to the invention. As can be seen in FIG. 5, in the connected state 24 the terminal lug 4 is not fixed in place on the device connector 3, but rather can simply be raised up from it again.

For fixation of the terminal lug 4 on the device connector 3, the connection system 1 comprises a fixation element 7, with which the terminal lug 4 can be fixed in place on the device connector 3 in the connected state 24, with shape fit and/or with force fit, in particular by means of a screwed connection, to produce a fixed state 25. Such a fixed state 25 is illustrated in FIG. 6. In the exemplary embodiments shown, the fixation takes place by means of a screwed connection, wherein in FIG. 7, accordingly, an outside thread 21 is indicated on the device connector 3, and the fixation element 7 has a matching inside thread (not shown), so that the fixation element 7 can be screwed onto the device connector 3.

As can be seen in the sectional view of FIG. 2, the terminal lug 4 is overmolded with an elastomer in the region of its connecting section 5. In this regard, the elastomer overmold 12 forms a holder 8 having a wall 15 that is arranged on the connecting section 5 and extends in a normal direction 9, with a closed circumference, wherein the normal direction 9 stands normal on a plane of the opening 6 and faces away from a top side 10 of the connecting section 5.

The fixation element 7 forms a section of a locking unit 13 of the connection system 1. The locking unit 13 furthermore comprises a cap element 14, which covers the fixation element 7, at least in certain sections, see FIG. 3, which shows a sectional view according to the section line III-III in FIG. 1.

In the fixed state 25, the locking unit 13 is arranged within the holder 8, at least in certain sections, see FIG. 6 and FIG. 7. In this regard, the cap element 14 is designed or set up so as to press against the wall 15 in the fixed state 25 and deform it elastically, at least in certain sections, so as to achieve a seal between the wall 15 and the cap element 14. In total, in this way a seal of the device connector 3 is achieved from that side of the terminal lug 4 on which the holder 8 is arranged.

In the first exemplary embodiment shown, the locking unit 13 or the cap element 14 presses against the wall 15 from the inside to the outside in the fixed state, see FIG. 7, which shows a sectional view along the section line VII-VII in FIG. 6. In other words, the cap element 14 is set up for being arranged in the holder 8 in the fixed state 25, at least in certain sections, and, in this regard, elastically deforming the wall 15 by means of pressure from the interior of the holder 8 to the outside, with a directional component parallel to radial directions 16 that stand normal to the normal direction 9 and face outward.

As is also clearly evident from FIG. 2 and FIG. 7, in the first exemplary embodiment shown, the holder 8 has ribs 17 that lie on the inside, which project away from the wall 15 with a directional component counter to the radial directions 16. Accordingly, the ribs 17 that lie on the inside are elastically deformed by the cap element 14, in the fixed state, and thereby an improvement in the sealing effect is achieved.

In this regard, the ribs 17 that lie on the inside run in a circumferentially closed manner.

Figure 16:
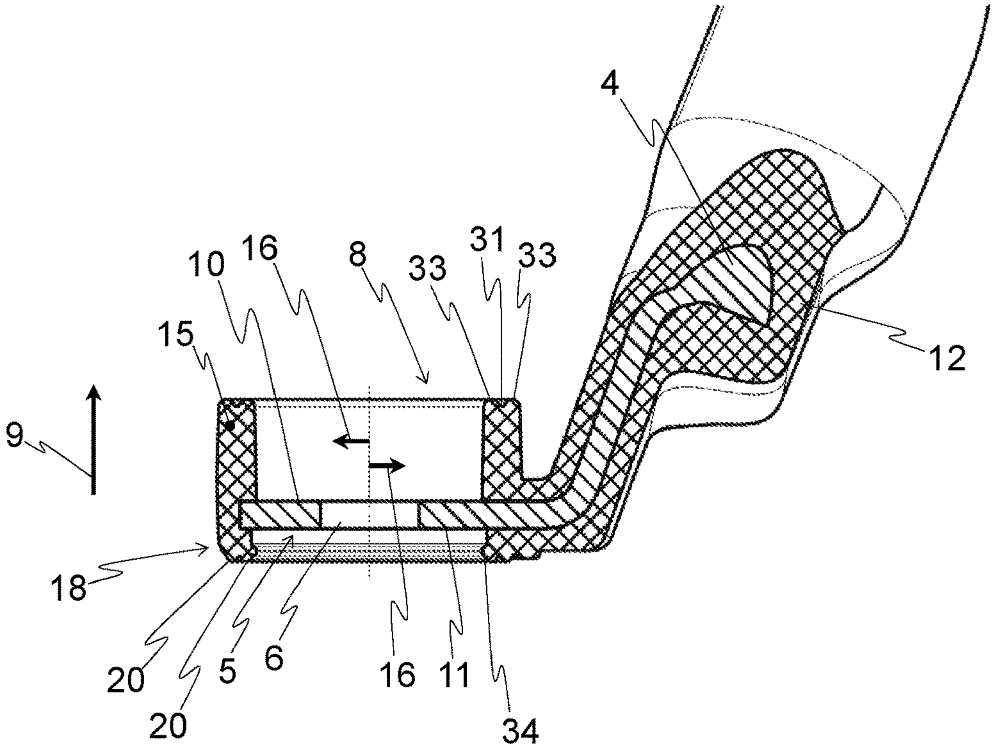
FIG. 16 shows a sectional view of the terminal lug of a third embodiment of the connection system according to the invention, analogous to FIG. 2.

Finally, FIG. 2 and FIG. 7, in particular—and, in an analogous manner, FIG. 10 and FIG. 15 as well as FIG. 16 and FIG. 20—show that the elastomer overmold 12 is arranged, in all the exemplary embodiments shown, also on the top side 10 of the connecting section 5 and on an underside 11 of the connecting section 5 that lies opposite the top side 10, in certain sections. The increase in mechanical stability of the elastomer overmold 12 brought about in this manner has an advantageous effect on the sealing effect, because correspondingly high forces can be applied to the wall 15 by means of the cap element 14, so as to bring about elastic deformation of the wall, without an additional counter-bearing for the wall 15 necessarily being required.

In all the exemplary embodiments shown, the elastomer overmold 12 furthermore forms a sealing foot 18, which is arranged on the connecting section 5 opposite to the holder 8, and extends counter to the normal direction 9, in a circumferentially closed manner, see FIG. 2, FIG. 10, and FIG. 16, so as to lie against the device housing 19, forming a seal, in the fixed state 25. In this way, sealing of the device connector 3 can be achieved not just from that side of the terminal lug 4 on which the holder 8 is arranged, but also from the opposite side, which faces the device housing 19 in the fixed state 25, so that the device connector 3 can be sealed off from all sides.

In all the exemplary embodiments shown, the sealing foot 18 has two concentric axial sealing lips 20, which run with a closed circumference and extend with a directional component counter to the normal direction 9. Furthermore, the sealing foot 18 has a radial sealing lip 34, which runs with a closed circumference and extends with a directional component counter to the radial directions 16. The axial sealing lips 20 improve the sealing effect, in that they are pressed against the device housing 19, in the fixed state 25, with a directional component anti-parallel to the normal direction 9, and deform elastically, see FIG. 7, FIG. 15, and FIG. 20. The radial sealing lip 34 improves the sealing effect in that it is pressed against the device housing 19, in the fixed state 25, with a directional component anti-parallel to the radial directions 16, and thereby deforms elastically, see FIG. 7, FIG. 15, and FIG. 20.

In all the exemplary embodiments shown, the fixation element 7 and the cap element 14 are connected to one another by means of pressing using ultrasound. In this regard, the cap element 14 is produced from a polyamide reinforced with glass fibers, in each instance. In this regard, the cap element 14 is provided with an activation section 22 that is configured as a hex head, so as to allow problem-free engagement of a tool 23, see FIG. 8, so that a specific tightening torque, for example, can be set when it is screwed onto the device connector 3, in a problem-free manner.

In the system according to the invention that is shown in connection with the first embodiment of the connection system 1 according to the invention, the device housing 19 has two projecting wall sections 26, which are spaced apart from the device connector 3, see FIG. 4. In this regard, the two wall sections 26 are arranged to lie opposite one another and cover an angle range around the device connector 3 that lies in the range from 120° to 180°.

As is illustrated in FIG. 9, the cap element 14, in the fixed state 25, presses the wall 15 against the wall sections 26. In other words, the wall sections 26 act as counter-bearings for the wall 15. Accordingly, the sealing effect is increased once again, at least in the region of the wall sections 26. Furthermore, the wall sections 26 offer protection against mechanical effects from the outside against the device connector 3 or against the holder 8 and the terminal lug 4 in the connected state 24 and in the fixed state 25, in certain sections.

Figure 11:
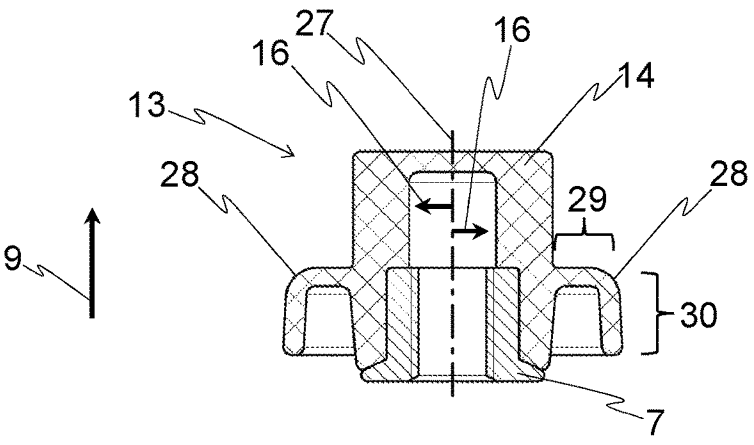
FIG. 11 shows a sectional view of the locking unit of the second embodiment of the connection system according to the invention, analogous to FIG. 3.

FIG. 10 shows a sectional view of the terminal lug 4 of a second embodiment of the connection system 1 according to the invention. FIG. 11 shows a sectional view of the related locking unit 13. Fundamentally, what has been said with regard to the first embodiment of the connection system 1 according to the invention applies, unless something different is explicitly indicated, and therefore no repetition will be made.

In contrast to the first embodiment, the cap element 14 has a cross-section with particularly marked, projecting arms 28 in a section plane that corresponds to the plane of the drawing in FIG. 11, wherein a longitudinal axis 27 of the locking unit 13 lies in the section plane. The arms 28 in FIG. 11 result from a cut through a circumferential section of the cap element 14, which circumferential section has a brim-like form in an axonometric view of the locking unit 13 or of the cap element 14, see FIG. 14.

In the fixed state 25, the arms 28 run parallel to one of the radial directions 16 in a first arm section 29, and with a directional component anti-parallel to the normal direction 9 in a second arm section 30, in each instance, wherein the second arm section 30 is arranged behind the first arm section 29, viewed in the corresponding radial direction 16, see FIG. 11.

By means of the arms 28, the cap element can encompass the wall 15 at least in certain sections, or the cap element 14 is accordingly set up for encompassing the wall 15, at least in certain sections, in the fixed state 25, with the arms 28, and for elastically deforming the wall 15 by means of pressure from the outside, with a directional component counter to the radial directions 16. The desired seal is achieved, once again, by means of the elastic deformation of the wall 15.

To improve the sealing effect, in the second exemplary embodiment shown, the holder 8 has ribs 32 that lie on the outside, which project outward from the wall 15 with a directional component parallel to the radial directions 16, and are deformed by the cap element 14 in the fixed state 25, see FIG. 15. The arms 28, in particular the second arm sections 30, are dimensioned in such a manner, in this regard, that all the ribs 32 that lie on the outside are contacted by the cap element 14 in the fixed state 25. In this regard, the ribs 32 that lie on the outside run in a circumferentially closed manner.

Although ribs that lie on the inside are not excluded, they are not provided in the second exemplary embodiment shown, see FIG. 10.

With regard to the system according to the invention, comprising the connection system 1 according to the invention and the device housing 19 having the device connector 3, it should be noted that the device housing 19 shown in connection with the second exemplary embodiment does not have any projecting wall sections, see FIG. 12, which shows the device housing 19, and FIG. 13, which shows the connected state 24 with the terminal lug 4 arranged on the device housing 19. Accordingly, in the fixed state 25, the wall 15 is also not pressed against wall sections, see FIG. 15.

Figure 17:
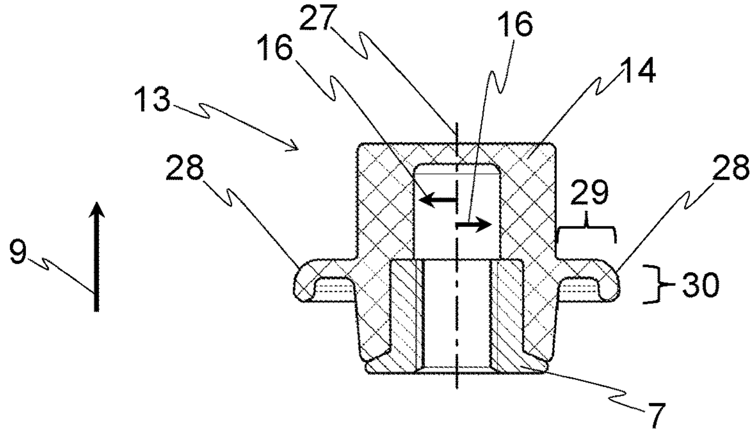
FIG. 17 shows a sectional view of the locking unit of the third embodiment of the connection system according to the invention, analogous to FIG. 3.

FIG. 16 shows a sectional view of the terminal lug 4 of a third embodiment of the connection system 1 according to the invention. FIG. 17 shows a sectional view of the related locking unit 13. Fundamentally, what has been said with regard to the first embodiment of the connection system 1 according to the invention applies, unless something different is explicitly indicated, and therefore no repetition will be made.

In contrast to the first embodiment, the cap element 14 has a cross-section with particularly marked, projecting arms 28 in a section plane that corresponds to the plane of the drawing in FIG. 17, wherein the longitudinal axis 27 of the locking unit 13 lies in the section plane. The arms 28 in FIG. 17 result from a cut through a circumferential section of the cap element 14, which circumferential section has a brim-like form in an axonometric view of the locking unit 13 or of the cap element 14, see FIG. 19.

In the fixed state 25, the arms 28 run, at least in certain sections, with a directional component parallel to the radial directions 16, wherein the cap element 14 is set up for pressing against an end face 31 of the wall 15 with the arms 28, at least in certain sections, in the fixed state 25, and thereby elastically deforming the wall 15. Once again, the desired seal is achieved by means of the elastic deformation of the wall 15.

In concrete terms, also in the third exemplary embodiment, the arms 28, in the fixed state 25, run with a directional component parallel to one of the radial directions 16 in the first arm section 29, and with a directional component anti-parallel to the normal direction 9 in the second arm section 30, in each instance, wherein the second arm section 30 is arranged behind the first arm section 29, viewed in the corresponding radial direction 16, see FIG. 17. For the function described above, of pressing against the end face 31 of the wall 15, the first arm section 29 is decisive. Accordingly, in the third exemplary embodiment, in comparison with the second exemplary embodiment, the expanse of the arms 28 in the second arm section 30 is clearly reduced. In the case of the third exemplary embodiment, the corresponding second arm section 30 serves, above all, for guiding the wall 15 and ensuring that the wall 15 does not slide away outward from the corresponding first arm section 29 in the region of the end face 31, parallel to the radial directions 16.

In the third exemplary embodiment shown, to improve the sealing effect, the holder 8 has two end-face ribs 33 that project away from the end face 31 of the wall 15 with a directional component parallel to the normal direction 9, and are deformed by the cap element 14 in the fixed state 25, see FIG. 20. The end-face ribs 33 run with a closed circumference and are arranged concentrically.

The arms 28, in particular the first arm sections 29, are dimensioned, in this regard, in such a manner that in the fixed state 25, all the end-face ribs 33 are contacted by the cap element 14.

Although ribs that lie on the inside as well as ribs that lie on the outside are not excluded, they are not provided in the third exemplary embodiment shown, see FIG. 16.

Figure 18:
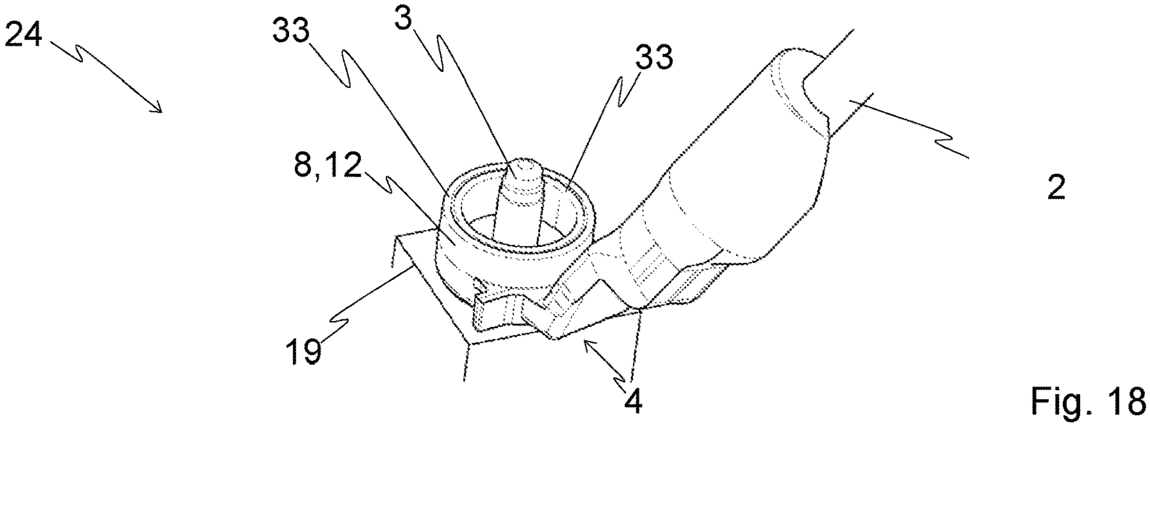
FIG. 18 shows an axonometric view of the terminal lug from FIG. 16 in a connected state with the device connector from FIG. 12.

With regard to the system according to the invention, comprising the connection system 1 according to the invention and the device housing 19 with the device connector 3, it should be noted that the device housing 19 shown in connection with the third exemplary embodiment does not have any projecting wall sections, see FIG. 12, which shows the device housing 19, and FIG. 18, which shows the connected state 24 with the terminal lug 4 arranged on the device housing 19. Accordingly, in the fixed state 25 the wall 15 is also not pressed against wall sections, see FIG. 20.

Although only a few embodiments of the present invention have been shown and described, it is to be understood that many changes and modifications may be made thereunto without departing from the spirit and scope of the invention.

What is claimed is:

1. A system comprising a connection system for electrically connecting a cable to a device connector, the connection system comprising:

a terminal lug comprising a connecting section having an opening open or closed at an edge of the opening and configured to bring the terminal lug into a connected state in engagement with the device connector;

a fixation element configured to fix the terminal lug in place in the connected state on the device connector with at least one of a shape fit and a force fit to produce a fixed state; and an elastomer overmold overmolded onto the terminal lug at least in a region of the connecting section to form a holder having a wall arranged on the connecting section and extending from a top side of the connecting section in a normal direction to a plane of the opening with a closed circumference;

wherein the fixation element forms a section of a locking unit arranged at least in sections within the holder in the fixed state and comprising a cap element configured to cover at least sections of the fixation element; and wherein the cap element is configured to press against and elastically deform at least sections of the wall in the fixed state to achieve a seal between the wall and the cap element, wherein the fixation element and the cap element are produced in one-piece or the cap element is an overmold overmolded onto the fixation element or the fixation element is connected to the cap element, wherein the system further comprises a device housing and the device connector arranged on the device housing, wherein the device housing has at least one projecting wall section spaced apart from the device connector; and wherein in the fixed state, at least sections of the wall are pressed against the at least one wall section by the cap element.

2. The system according to claim 1, wherein the fixation element is configured to fix the terminal lug in place in the connected state of the device connector using a screw connection.

3. The system according to claim 1, wherein the cap element is configured to be arranged in at least sections of the holder in the fixed state for elastically deforming the wall by pressure from an interior of the holder outward; and wherein the pressure has a directional component parallel to radial directions normal to the normal direction and facing outward.

4. The system according to claim 1, wherein the cap element has a cross-section with projecting arms, in a section plane;

wherein a longitudinal axis of the locking unit lies in the section plane;

wherein in the fixed state, at least certain sections of the arms extend with a directional component parallel to radial directions normal to the normal direction and facing outward; and wherein the cap element is configured to press with the arms in the fixed state against at least sections of an end face of the wall facing away from the connecting section and thereby elastically deform the wall.

5. The system according to claim 1, wherein at least sections of the elastomer overmold are arranged on at least one of the top side of the connecting section and an underside of the connecting section opposite the top side.

6. The system according to claim 1, wherein the holder has inside ribs projecting away from the wall in an interior of the holder with a directional component counter to radial directions normal to the normal direction and facing outward; and/or wherein the holder has outside ribs projecting away from the wall on an outside of the holder with a directional component parallel to the radial directions; and/or wherein the holder has end-face ribs projecting away from an end face of the wall facing away from the connecting section with a directional component parallel to the normal direction.

7. The system according to claim 1, wherein the cap element is produced from a thermoplastic or from a thermoplastic having at least one filler.

8. The system according to claim 1, wherein the cap element is produced from a polyamide reinforced with glass fibers.

9. The system according to claim 1, wherein the cap element has an activation section formed as a screw head.

10. The system according to claim 1, wherein the cap element has an activation section formed as a hexagonal screw head.

11. The system according to claim 1, wherein the cap element has a cross-section with projecting arms, in a section plane;

wherein a longitudinal axis of the locking unit lies in the section plane;

wherein in the fixed state, at least first sections of the arms extend with a directional component parallel to radial directions normal to the normal direction and facing outward, and at least second sections of the arms extend with a directional component anti-parallel to the normal direction; and wherein the cap element is configured to encompass at least sections of the wall with the arms in the fixed state and to elastically deform the wall by exterior pressure with a directional component counter to the radial directions.

12. The system according to claim 11, wherein each of the arms comprises a first arm section and a second arm section;

wherein the first arm section extends parallel to one of the radial directions with a respective first directional component, and the second arm section extends with a respective second directional component anti-parallel to the normal direction; and wherein the second arm section is arranged behind the first arm section, viewed in the radial direction corresponding to the respective first directional component.

13. The system according to claim 1, wherein the holder narrows toward the normal direction.

14. The system according to claim 13, wherein at least sections of the wall are configured to narrow conically toward the normal direction.

15. The system according to claim 1, wherein the elastomer overmold forms a sealing foot arranged on the connecting section opposite to the holder and extending in a circumferentially closed manner counter to the normal direction so as to lie against a device housing in the fixed state, forming a seal.

16. The system according to claim 15, wherein the sealing foot has at least one circumferentially closed axial sealing lip extending with a directional component counter to the normal direction; and/or at least one circumferentially closed radial sealing lip extending with a directional component counter to radial directions facing outward normal to the normal direction.

17. The system according to claim 1, wherein the fixation element is connected to the cap element.

18. The system according to claim 17, wherein the fixation element is connected to the cap element by pressing using ultrasound.

* * * * *